May 8, 1951 S. KALTOFT 2,552,097
TWO-WAY PLOW
Filed Dec. 1, 1949 3 Sheets-Sheet 1
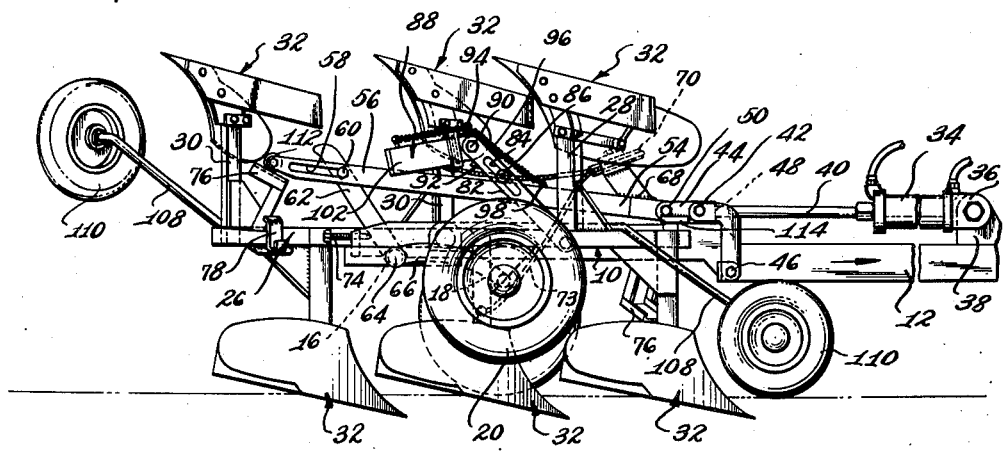
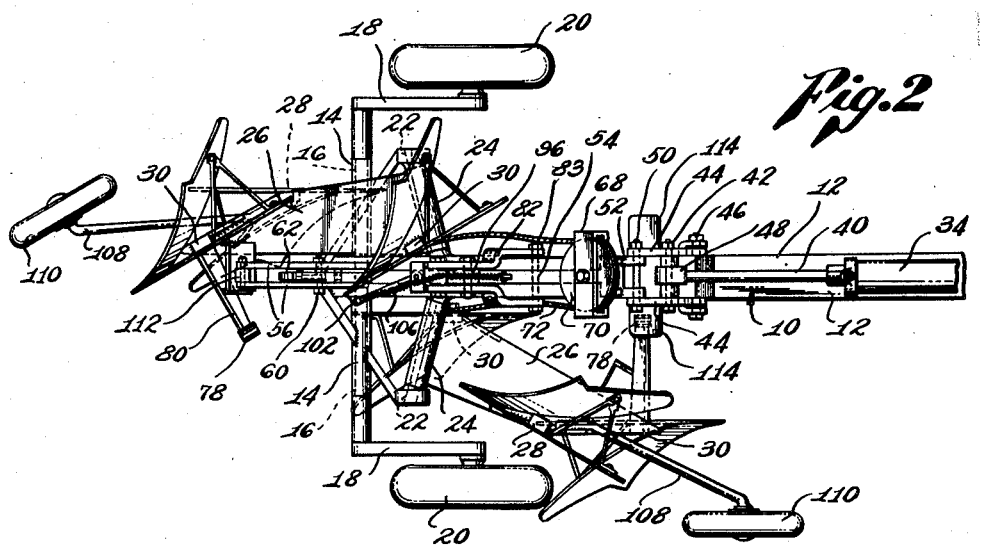
INVENTOR.
SIGURD KALTOFT
BY Wm Edward Hann
Attorney May 8, 1951 S. KALTOFT 2,552,097
TWO-WAY PLOW
Filed Dec. 1, 1949 3 Sheets-Sheet 2

INVENTOR.
SIGURD KALTOFT
BY Wm Edward Hann
Attorney

May 8, 1951          S. KALTOFT          2,552,097
TWO-WAY PLOW
Filed Dec. 1, 1949          3 Sheets-Sheet 3
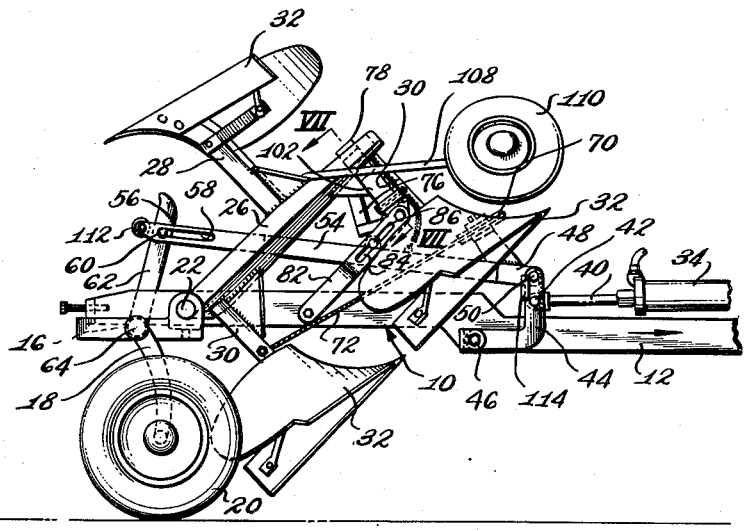
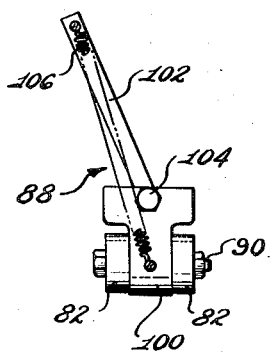
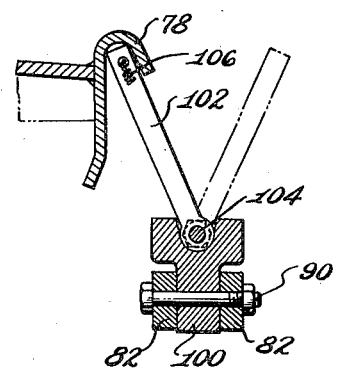
INVENTOR.
SIGURD KALTOFT
BY Wm Edward Hann
Attorney Patented May 8, 1951

2,552,097

UNITED STATES PATENT OFFICE 2,552,097

TWO-WAY PLOW

Sigurd Kaltoft, Bakersfield, Calif., assignor of one-half to George Delfino and Sons, Bakersfield, Calif., a copartnership Application December 1, 1949, Serial No. 130,540

4 Claims. (Cl. 97—24)

This invention relates to a plow and more particularly to a two-way plow construction which will permit plowing of successive, adjacent furrows across or lengthwise of a field.

Objects of the invention are to provide a two-way plow which is compact in arrangement and readily shiftable or adjustable so that it can be drawn back and forth across a field and the furrows will be turned in the same direction; to provide a plow having vertically and longitudinally reversed plow shares which can be readily manipulated to permit the plow to be drawn across the field in either direction; to provide means whereby multiple sections of a plow assembly can be selectively reversed; to provide means whereby the plow assembly sections can be positioned identically as well as reversed; to provide means for elevating the plow assembly relative to its supporting frame for transport; and to provide improved ground wheel and furrow wheel constructions and adjustments.

The above and other objects and advantages of the invention will more fully appear from the following description made in connection with the accompanying drawing wherein:

Fig. 1 is a side elevational view of an embodiment of the invention;

Fig. 2 is a plan view of the plow in the position of Fig. 1;

Fig. 5 is a side elevational view showing the machine in its transport position;

Fig. 6 is an enlarged detail in elevation of the plow boom selector; and

Fig. 7 is a sectional view showing the relationship of the selector to one of the plow booms.

Figure 3:
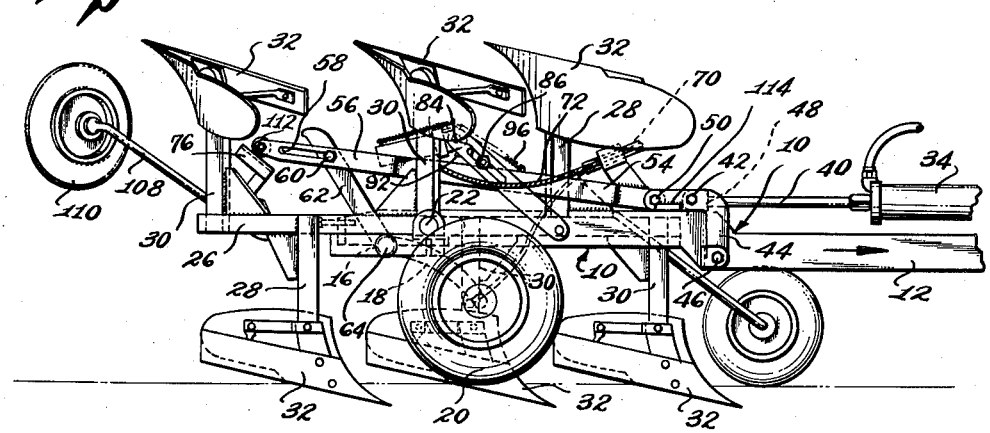
Fig. 3 is a side elevational view showing the plow set for throwing a furrow to the left, the front of the machine being at the right hand side of the sheet.

The structure shown in the drawing includes a frame 10 having a downwardly offset and forwardly extending draw bar portion 12. Extending laterally from rearward portions of the frame 10 are axle housings 14 having an axle 16 extending therethrough and through the frame itself. The axle 16 has offsets 18 at its ends and the outer ends of the offsets have ground wheels 20 mounted thereon.

Extending laterally outwardly and somewhat rearwardly from the frame 10 are shafts 22 having sleeves 24 lying thereabout. Secured to each of the sleeves 24 is a plow share boom 26. Each boom has a plow share supporting post 28 extending vertically from one side thereof and a pair of plow share supporting posts 30 extending from the opposite side thereof, the sides of the boom meaning, in this instance, the top and bottom surfaces of the boom. On the supporting posts 28 and 30 are secured plows or plow shares 32 which are indicated as such in their entirety. Each boom has a single plow share extending vertically therefrom at the top or bottom side and a pair of plow shares at the reverse side.

In the position of Fig. 2, the near boom 26 is swung to a point forwardly of its pivot shaft 22 and the other boom is swung to the rear of its pivot shaft. In this position, the near boom has a pair of downwardly disposed plow shares and a single upwardly disposed and inverted plow share. The rearward or far boom has a single downwardly disposed plow share and a pair of upwardly disposed inverted shares.

Figure 4:
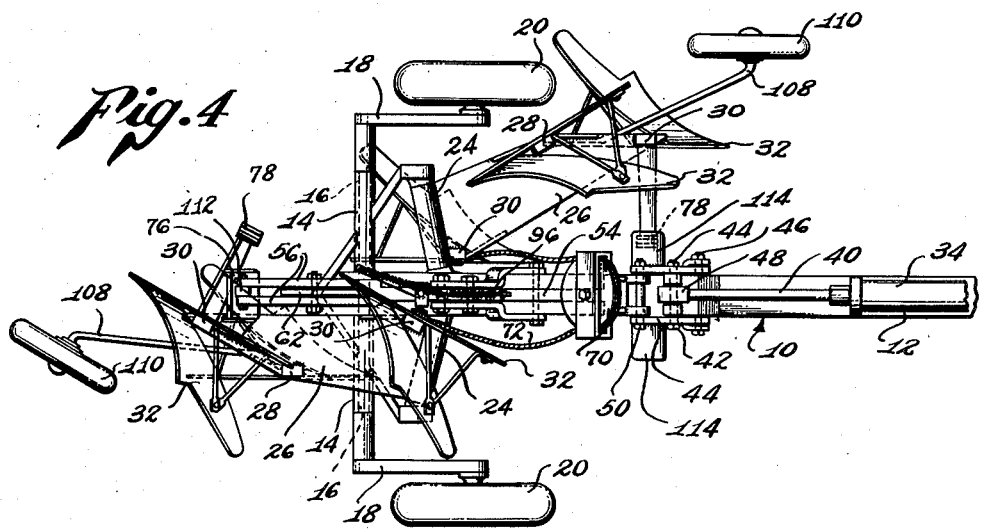
Fig. 4 is a plan view of the plow as shown in Fig. 3.

When the booms are reversed in position, such as in Fig. 4, the forwardly disposed boom has two plow shares on its under side and an inverted plow share at its upper side and the rearward or trailing boom has a single downwardly disposed plow share and two upwardly disposed and inverted plow shares.

It will be noted that the plow shares on each boom are not only inverted vertically at each side of the boom, but they are reversed longitudinally.

When furrows are first cut across a field with the plow in the position of Fig. 2, the two lower plow shares on the leading boom and the single share on the trailing boom are positioned to throw the furrow to the right, the direction of movement of the machine being to the right as viewed in that figure.

When the field has been crossed, the machine is turned around completely and the booms are reversed to the position of Fig. 4. As viewed in that figure, the now downwardly disposed plow shares indicate that the furrow would be thrown to the left but when the entire machine is reversed in direction from the position of Fig. 4, it will be seen that it will throw the furrows the same direction in the field as those formed by the machine in the position of Fig. 2.

On the forward end of the draw bar 12 is a hydraulic ram unit 34 connected by a clevis 36 to a bracket 38 which is mounted on the draw bar. Extending rearwardly from the cylinder of the ram unit is a piston rod 40 pivotally connected to a bolt 42 which extends between the arms of a pair of spaced angled levers 44, the latter being pivotally connected to the frame on a pivot pin 46. The rearward end of the piston rod 40 is provided with a connector head 48 which is apertured to receive the pivot pin 42.

The rear ends of the levers 44, as viewed in Figs. 1 and 2, are bridged by a bolt 50 which supports the forked forward end 52 of a link 54. The rear portion of the link 54 is provided with a fork 56 and the arms of said fork are provided with elongated slots 58. A bolt 60 extends through the slots 58 and is mounted in the upper portion of a bell crank arm 62 which is pivotally mounted at 64 to the lower rear portion of the frame 12. The other bell crank arm 66 is rigidly connected with the central portion of the ground wheel axle 16 so that when the bell crank arm 62 is shifted about the axis of the pivot 64 the ground wheels 20 can be raised and lowered.

A bracket 68 extends upwardly from the forward portion of the link 54 and it rotatably supports a pulley 70 about which a cable 72 is trained. Each end of the cable 72 is secured to a plow share supporting post 30 on each plow share boom which lies nearest the boom pivot shaft 22.

As the ram piston 40 is moved longitudinally of the frame it will swing the angled levers 44 from the rearward position of Fig. 1 to the forward position of Fig. 5. When the piston rod 40 moves to the rear or to the left, as viewed in Fig. 1, the link 54 will move correspondingly and shift the bell crank lever 62 rearwardly until said lever hits an adjustable stop screw 74 on the rear end of the frame 12. Concurrently, the forked rear end 56 of the link 54 will engage a slotted hold-down member 76 which extends upwardly from that one of the booms 26 which is in a trailing position. Each of the booms is provided with a hold-down member 76 and they successively occupy the same relative position when either boom is swung to a trailing position.

Each of the booms 26 is provided with a selector receiving hook 78 mounted on the end of a laterally extending arm 80. The trailing boom shown in Figs. 1 and 2 has the open bight of the hook disposed upwardly. When the trailing boom is swung upwardly, of course, its selector receiving hook 78 will swing over in a corresponding manner.

A fork yoke 82 has the ends of its arm mounted on a pivot bolt 83 which extends through the frame 12 and the yoke extends upwardly from the frame. Intermediate portions of the yoke are provided with elongated slots 84 which slidably receive a bolt 86 which is rigidly mounted on the upper medial portion of the link 54 which is connected to the angled pivoted levers 44 and actuated by the piston rod 40.

Between the upper ends of the arms of the yoke 82 a plow boom selector member 88 is pivotally mounted on a bolt 90 which extends through said yoke arms. The yoke 82 has a stop 92 which limits counterclockwise pivotal movement of the selector 88 and clockwise movement of said selector relative to the yoke 82 is limited by a stop 94 on the upper portion of the yoke. A tension spring 96 is connected between the selector member 88 adjacent its pivot 90 and a point 98 on the longitudinally shiftable link 56.

The selector 88, as shown in Figs. 6 and 7 is in two parts. There is an inner member 100 to which an outer member 102 is pivotally connected by means of a bolt or pin 104. A tension spring 106 is connected between the selector portion 100 and the outer end of the selector arm 102.

Consequently, when the arm 102 is shifted laterally, the spring 106 will shift laterally beyond the center of pivotal movement of the arm 102 and yieldably hold the selector arm 102 at an angle at either side of its pivot 104.

Extending diagonally from the plane of each plow share boom 26 at the free end thereof is a wheel support 108 upon which a furrow wheel 110 is rotatably mounted. As shown in Fig. 1, the furrow wheel on the leading boom is located below the boom whereas the furrow wheel on the trailing boom extends upwardly above said trailing boom when it is swung rearwardly to the position of Fig. 1.

With the plow in the position of Figs. 1 and 2, the booms and their respective plow shares can be reversed first by actuating the ram 34 to draw the piston rod 40 forwardly or to the right as viewed in those figures. This will move the link 56 in the same direction, carrying with it the pulley 70 and creating a forward pull on the cable 72.

Forward pull on the cable 72 will be transmitted to both of the plow share booms. It will cause the leading plow share boom to raise to the position of Fig. 5 and will also swing the trailing boom upwardly and forwardly until its center of gravity passes the vertical, whereupon the boom will fall forwardly and assume approximately the same angular position shown in Fig. 5.

The next step in the operation is to swing the near, or formerly leading boom, to the rear. When the leading boom was raised to the angular position of Fig. 5, its selector engaging hook 78 is shown in Fig. 5 as having moved upwardly with the boom and snapped over the upwardly disposed end of the selector arm 102. The piston rod 40 is then moved rearwardly or to the left as viewed in Fig. 5. This moves the link 54 to the rear and swings the yoke 82 and selector arm 102 in a counterclockwise direction toward the rear of the machine. The selector arm 102 will carry the near boom upwardly and rearwardly until the center of gravity of the boom and its plow shares passes the vertical, whereupon the boom will drop to a trailing position.

As the boom just mentioned swings upwardly and rearwardly, its selector engaging hook 78 will cross the longitudinal center line of the frame 12 and shift the selector arm 102 to the opposite side of the frame where it is yieldably held by reason of the fact that the selector arm spring 106 has crossed over the center of the selector arm portion 104. The diagonal movement of the selector arm hook 78 across the center line of the frame is produced by the angular disposition of the boom pivot shaft 22.

When the piston rod 40 and its connected link 54 are moved rearwardly as described above, the cable pulley 70 and the cable 72 will move rearwardly with the link and permit the two plow share booms to lower to the ground.

Obviously, return of the plow share booms from the position of Fig. 4 to the original position of Fig. 2 will be accomplished in the same manner as described above in moving the booms from the position of Fig. 2 to that of Fig. 4.

In either position of the plow assembly, when the trailing boom approaches the ground, a roller 112 on the rear of the link 54 will engage the hold-down member 76 on the trailing boom in order to hold the plow shares down in a proper plowing position.

When one of the booms is swung to a leading position, the hold-down member 114 on the angled levers 44 at the rear end of the piston rod 40 will engage and hold down the selector arm hook 78 on said leading boom.

In the rearward action of the piston rod 40 and the longitudinally extending link 54 which is connected thereto, said link 54 will rotate the bell crank arm 62 in a counterclockwise direction. The complementary bell crank arm 66 will raise the ground wheels to some extent and when the two plows on the underside of the leading boom engage the ground the adjacent ground wheel will be raised as indicated in Fig. 1.

It will be seen that the plow can be controlled from a tractor used to draw the implement over the ground merely by manipulating reversing valves, not shown, which are connected to the hydraulic ram 34. The plow can be drawn back and forth across the field and the furrows will all be turned in the same direction since the plow share booms are reversed after each run of the plow.

By providing a plow which will throw the furrows in the same direction regardless of the direction of movement of the plow unit across the field, there will be no dead furrows. Dead furrows are particularly objectionable in irrigated fields since they are of greater flow capacity than a normal furrow and will cause run off of water instead of permitting the field to be uniformly irrigated. It is customary for the irrigation flow to be directed across the length of the furrows.

It will of course be understood that various changes can be made in the form, details, arrangement and proportions of the various parts of the foregoing disclosure without departing from the spirit of the invention.

I claim as my invention:

1. In a plow, a frame, a pair of plow share booms pivoted on said frame on axes directed laterally therefrom in generally opposite directions, said booms being swingable to positions with one trailing the other, vertically reversed plow shares on the upper and lower sides of the booms, and the plow shares on the lower side of the leading boom lying ahead of and being greater in number than a share or shares on the trailing boom, to balance and offset lateral drag due to the unbalanced longitudinal location of said booms and plow shares.

2. In a plow, a frame, a pair of plow share booms pivotally supported by said frame at opposite side portions thereof, vertically and longitudinally reversed plow shares on the top and bottom sides of said booms, said booms being swingable about their pivots to vertically reversed points relative to each other, a pair of ground wheels at opposite side portions of said frame, and connections between said ground wheels and frame providing vertical movement of said wheels relative to said frame.

3. The structure in claim 2, and each of said booms having a furrow wheel carried thereby and located at one vertical side of its respective boom.

4. In a plow, a frame, a pair of plowshare booms, pivotal mountings for said booms having their axes directed laterally in generally opposite directions from said frame, the booms being swingable relative to said frame to positions forwardly and rearwardly of said pivotal mountings, a boom actuating device on said frame including a boom selector shiftable relative to said booms to selectively engage and swing the booms, and said selector comprising a member swingable longitudinally of said frame, said member also being shiftable laterally into the path of movement of either of said booms to engage and vertically swing the booms through at least a part of their swinging movement.

SIGURD KALTOFT.

REFERENCES CITED

The following references are of record in the file of this patent:

UNITED STATES PATENTS

| Number | Name | Date |
|---|---|---|
| 348,204 | Greening | Aug. 31, 1886 |

FOREIGN PATENTS

| Number | Country | Date |
|---|---|---|
| 19,753 | Germany | Oct. 25, 1882 |